(12) United States Patent
Hasegawa

(10) Patent No.: US 11,764,674 B2
(45) Date of Patent: Sep. 19, 2023

(54) ON-BOARD POWER SUPPLY DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takeshi Hasegawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 47 days.

(21) Appl. No.: 17/430,556

(22) PCT Filed: Jan. 27, 2020

(86) PCT No.: PCT/JP2020/002645
§ 371 (c)(1),
(2) Date: Feb. 28, 2022

(87) PCT Pub. No.: WO2020/166307
PCT Pub. Date: Aug. 20, 2020

(65) Prior Publication Data
US 2022/0190715 A1 Jun. 16, 2022

(30) Foreign Application Priority Data
Feb. 15, 2019 (JP) .................................. 2019-025053

(51) Int. Cl.
*H02M 3/155* (2006.01)

(52) U.S. Cl.
CPC .................................. *H02M 3/155* (2013.01)

(58) Field of Classification Search
None
See application file for complete search history.

(56) References Cited

U.S. PATENT DOCUMENTS 5,770,940 A 6/1998 Goder
6,411,068 B1 6/2002 Willis
(Continued)

OTHER PUBLICATIONS

International Search Report, Application No. PCT/JP2020/002645 dated Mar. 24, 2020. ISA/Japan Patent Office.

*Primary Examiner* — Jeffery S Zweizig
(74) *Attorney, Agent, or Firm* — Honigman LLP

(57) ABSTRACT

An on-board power supply device includes: a voltage conversion unit; a first voltage detection unit that detects a value of a first voltage that is applied to a second conduction path; and a second voltage detection unit that detects a value of a second voltage that is applied to a load-side conduction path. Furthermore, the on-board power supply device includes: a target voltage setting unit that sets a target voltage value based on the value of the second voltage detected by the second voltage detection unit; and a control unit. The control unit repeatedly performs feedback calculation for updating a duty ratio of a control signal based on the value of the first voltage detected by the first voltage detection unit so as to bring the value of the first voltage applied to the second conduction path closer to the target voltage value.

7 Claims, 4 Drawing Sheets

(56) References Cited

U.S. PATENT DOCUMENTS

| | | | |
|---|---|---|---|
| 6,873,140 B2* | 3/2005 | Saggini | H02M 3/157 323/283 |
| 7,560,917 B2* | 7/2009 | Ho | H02M 3/158 323/288 |
| 8,441,244 B2* | 5/2013 | Bianco | H02M 3/156 323/284 |
| 8,593,125 B1 | 11/2013 | Xue | |
| 9,893,615 B2 | 2/2018 | Suzuki et al. | |
| 11,183,928 B2* | 11/2021 | Cao | H02M 3/156 |
| 2011/0304309 A1 | 12/2011 | Nakamura | |
| 2016/0204704 A1 | 7/2016 | Cao | |

* cited by examiner

ON-BOARD POWER SUPPLY DEVICE

CROSS-REFERENCE TO RELATED APPLICATIONS

This application is the U.S. national stage of PCT/JP2020/002645 filed on Jan. 27, 2020, which claims priority of Japanese Patent Application No. JP 2019-025053 filed on Feb. 15, 2019, the contents of which are incorporated herein.

TECHNICAL FIELD

The present disclosure relates to an on-board power supply device.

BACKGROUND

Among conventional on-board power supply devices, a configuration is known in which a constant voltage is output so as to bring the output voltage of an on-board power supply device closer to a target voltage value by performing feedback control based on the deviation between the value of the output voltage of the on-board power supply device and the target voltage value. JP 2015-139339A discloses one example of such a type of on-board power supply device, and in this device, a setting method is adopted in which a target voltage value that is lower than a final target voltage value is set in advance, and the target voltage value is gradually brought closer to the final target voltage value as the output voltage increases.

In a device such as the device disclosed in JP 2015-139339A in which a setting method is adopted in which the target voltage value is gradually brought closer to the final target voltage value, physical characteristics tend to differ significantly between an output voltage value that is detected to perform feedback control and a terminal voltage value of a supply-destination load during a transitional state in which the target voltage value is gradually increased. If a setting method in which the target voltage value is set based on the output voltage value is adopted in such a device, it is difficult to responsively set a target voltage value that is suitable as the actual load voltage (load terminal voltage).

In view of this, in order to solve at least one of the above-described problems, a technique is realized that allows an output voltage to be applied to an output-side conduction path while repeatedly performing feedback calculation so as to bring the output voltage closer to a target voltage value, and that allows a target voltage value that is suitable as a voltage applied to a load to be responsively set.

SUMMARY

An on-board power supply device that is one example of the present disclosure includes: a voltage conversion unit that includes a switching element that switches on and off according to a control signal in which an on signal and an off signal are alternately repeated provided to the switching element, the voltage conversion unit stepping up or stepping down a voltage applied to a first conduction path according to the switching of the switching element between on and off, and applying a voltage to a second conduction path; a first voltage detection unit that detects a value of a first voltage that is applied to the second conduction path; a second voltage detection unit that detects a value of a second voltage that is applied to a load-side conduction path that is interposed between the second conduction path and a load; a target voltage setting unit that sets a target voltage value based on the value of the second voltage detected by the second voltage detection unit; and a control unit that repeatedly performs feedback calculation for updating a duty ratio of the control signal based on the value of the first voltage detected by the first voltage detection unit so as to bring the value of the first voltage applied to the second conduction path closer to the target voltage value, and outputs the control signal with the updated duty ratio to the switching element each time the duty ratio is updated.

Advantageous Effects of Invention

According to the present disclosure, an output voltage can be applied to an output-side conduction path while repeatedly performing feedback calculation so as to bring the output voltage closer to a target voltage value, and a target voltage value that is suitable as a voltage applied to a load can be responsively set.

DETAILED DESCRIPTION OF PREFERRED EMBODIMENTS

Figure 1:
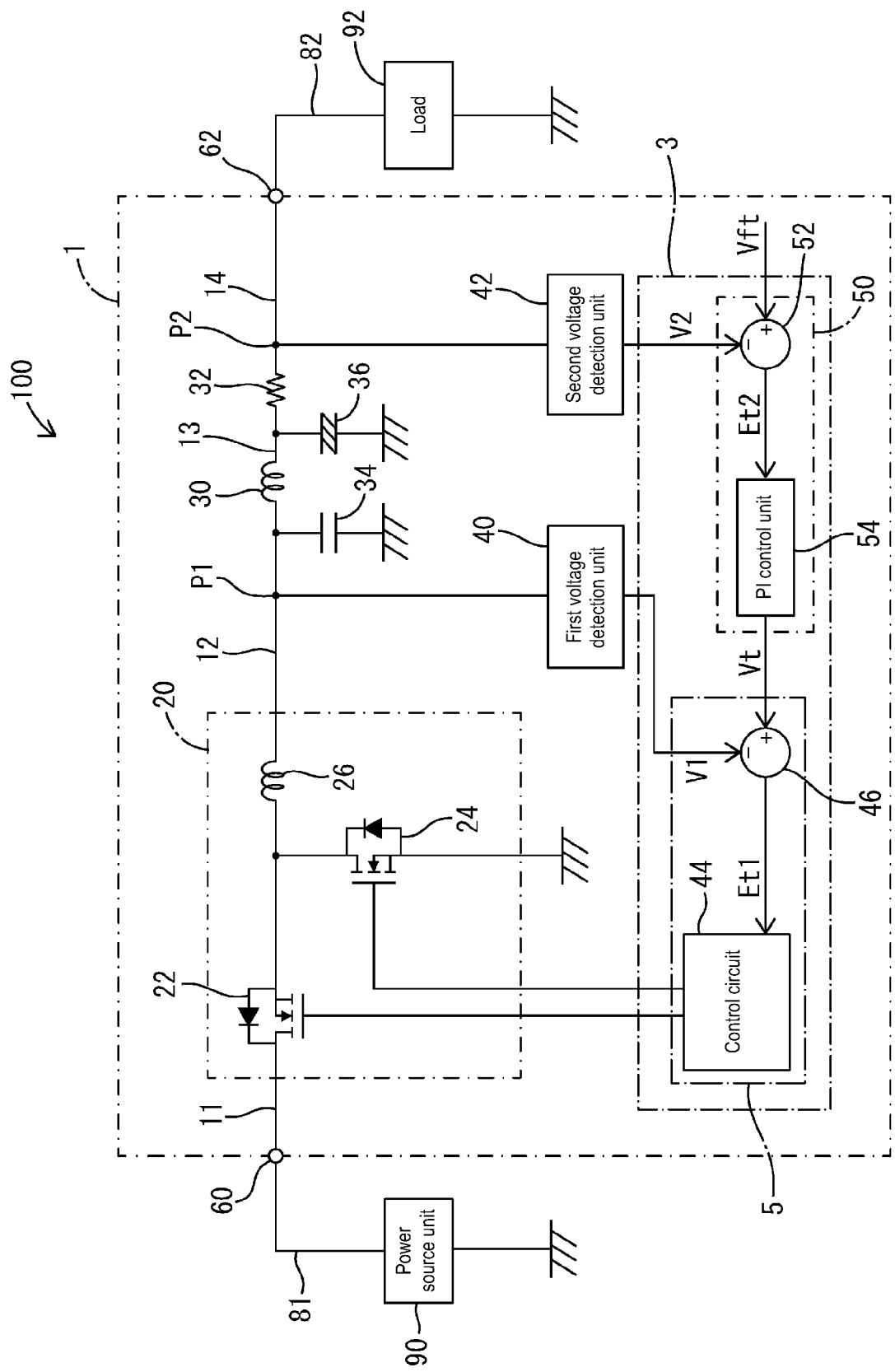
FIG. 1 is a circuit diagram schematically illustrating an on-board power supply system including an on-board power supply device according to embodiment 1.

An on-board power supply device that is one example of the present disclosure may be configured to include: a voltage conversion unit that steps up or steps down a voltage applied to a first conduction path and applies a voltage to a second conduction path; and a first voltage detection unit that detects a value of a first voltage that is applied to the second conduction path. Furthermore, the on-board power supply device may be configured to include: a second voltage detection unit that detects a value of a second voltage that is applied to a load-side conduction path interposed between the second conduction path and a load; and a target voltage setting unit that sets a target voltage value based on the value of the second voltage detected by the second voltage detection unit. Also, the on-board power supply device may be configured to include a control unit that outputs a control signal to the switching element, and the control unit may be configured to repeatedly perform feedback calculation for updating a duty ratio of the control signal based on the value of the first voltage detected by the first voltage detection unit so as to bring the value of the first voltage applied to the second conduction path closer to the target voltage value.

When such a configuration is adopted, the target voltage setting unit can set the target voltage value based on the voltage value of a path (load-side conduction path) that is closer to the load than the second conduction path, to which the output voltage from the voltage conversion unit is applied, is. Accordingly, even if the physical characteristics of the second conduction path and the load-side conduction path differ, a target voltage value that is suitable as the voltage applied to the load can be responsively set.

In the on-board power supply device that is one example of the present disclosure, the target voltage setting unit may operate so as to repeatedly perform processing for updating the target voltage value based on a deviation between a preset target voltage reference value and the value of the second voltage detected by the second voltage detection unit so as to bring the target voltage value closer to the target voltage reference value.

When such a configuration is adopted, even if the value of the second voltage applied to the load-side conduction path differs from the target voltage reference value, the target voltage value can be gradually brought closer to the target voltage reference value while responsively setting a target voltage value that is suitable as the voltage applied to the load by repeating processing for updating the target voltage value based on the voltage value of the load-side conduction path.

In the on-board power supply device that is one example of the present disclosure, a cycle at which the target voltage setting unit updates the target voltage value may be longer than a cycle at which the control unit updates the duty ratio.

When such a configuration is adopted, the update frequency of the duty ratio can be increased by setting a short update cycle. On the other hand, since the target voltage value can be updated at a cycle longer than the update cycle of the duty ratio, the processing load required to update the target voltage value can be suppressed.

The on-board power supply device that is one example of the present disclosure may include one or more electronic components that are arranged between the second conduction path and the load-side conduction path. Furthermore, the one or more electronic components may include at least one of a resistor portion and an inductor portion.

When such a configuration is adopted, while utilizing the functions of the electronic components, the target voltage can be set in accordance with the voltage of the load-side conduction path even if the voltage of the second conduction path and the voltage of the load-side conduction path differ from one another due to the electronic components.

First Embodiment

An on-board power supply system 100 illustrated in FIG. 1 includes a power source unit 90 and an on-board power supply device 1 (also simply referred to in the following as a power supply device 1), and is configured as a system that can supply electric power to a load 92 installed to a vehicle.

Note that, in the present specification, a "voltage" refers to a potential difference from the ground potential unless explicitly limited in particular.

For example, the power source unit 90 is configured as a known on-board battery such as a lead battery. A high-potential-side terminal of the power source unit 90 is electrically connected to a first wiring portion 81, and the power source unit 90 applies a predetermined output voltage to the first wiring portion 81. The power source unit 90 is electrically connected to an input-side terminal 60 of the on-board power supply device 1 via the first wiring portion 81. The output voltage of the power source unit 90 when fully charged is set to a value that is greater than 0V and that is greater than a later-described target voltage reference value Vft.

The load 92 is configured as a known on-board electric component. The load 92 is electrically connected to an output-side terminal 62 of the power supply device 1 via a second wiring portion 82. Electric power is supplied to the load 92 from the power source unit 90 via the first wiring portion 81, the power supply device 1, and the second wiring portion 82.

The power supply device 1 includes a first conduction path 11, a second conduction path 12, a voltage conversion unit 20, an intermediate conduction path 13, a load-side conduction path 14, a second inductor portion 30 (also simply referred to in the following as an inductor portion 30), a resistor portion 32, a capacitor portion 34, a capacitor portion 36, the input-side terminal 60, the output-side terminal 62, a first voltage detection unit 40, a second voltage detection unit 42, and a voltage conversion control device 3.

The first conduction path 11 functions as an input-side conduction path of the voltage conversion unit 20. One end of the first conduction path 11 is electrically connected to the input-side terminal 60 and the other end of the first conduction path 11 is electrically connected to the voltage conversion unit 20. That is, the voltage conversion unit 20 is electrically connected to the power source unit 90 via the first conduction path 11, and can receive supply of electric power from the power source unit 90.

The second conduction path 12 functions as an output-side conduction path of the voltage conversion unit 20. One end of the second conduction path 12 is electrically connected to the voltage conversion unit 20 and the other end of the second conduction path 12 is electrically connected to the second inductor portion 30.

The intermediate conduction path 13 is a conduction path interposed between the second conduction path 12 and the output-side terminal 62, and is arranged as a path that is closer to the load 92 than the second conduction path 12 is. One end of the intermediate conduction path 13 is electrically connected to the other end of the second inductor portion 30 and the other end of the intermediate conduction path 13 is electrically connected to one end of the resistor portion 32.

The load-side conduction path 14 is a conduction path interposed between the second conduction path 12 and the output-side terminal 62, and is arranged as a path that is closer to the load 92 than the second conduction path 12 is (specifically, as a path that is closer to the load 92 than the intermediate conduction path 13 is). One end of the load-side conduction path 14 is electrically connected to the other end of the resistor portion 32 and the other end of the load-side conduction path 14 is electrically connected to the output-side terminal 62.

The second inductor portion 30 is one example of the one or more electronic components and the inductor portion. The second inductor portion 30 is configured as a known inductor, for example, and is interposed between the second conduction path 12 and the load-side conduction path 14. One end of the second inductor portion 30 is electrically connected to the second conduction path 12 and the other end of the second inductor portion 30 is electrically connected to the intermediate conduction path 13. In other words, the second inductor portion 30 is arranged closer to the load 92 than the second conduction path 12 is, and the load-side conduction path 14 is arranged closer to the load 92 than the second inductor portion 30 is. The second inductor portion 30 may function as a filter, or may have a function other than this.

The resistor portion 32 is configured as a known resistor, for example, and is interposed between the second conduction path 12 and the load-side conduction path 14. One end of the resistor portion 32 is electrically connected to the intermediate conduction path 13 and the other end of the resistor portion 32 is electrically connected to the load-side conduction path 14. In other words, the resistor portion 32 is arranged closer to the load 92 than the second conduction path 12 is, and the load-side conduction path 14 is arranged closer to the load 92 than this resistor portion 32 is. The resistor portion 32 may function as a shunt resistor for current detection, or may have another function.

The capacitor portion 34 is configured as a known non-polar capacitor, for example. One end of the capacitor portion 34 is electrically connected to the second conduction path 12 and the other end of the capacitor portion 34 is electrically connected to a reference conduction path (ground).

The capacitor portion 36 is configured as a known polar capacitor, for example. One end of the capacitor portion 36 is electrically connected to the intermediate conduction path 13 (the other end of the second inductor portion 30 and one end of the resistor portion 32) and the other end of the capacitor portion 36 is electrically connected to the reference conduction path (ground).

The voltage conversion unit 20 is configured as a known DC/DC converter, for example, and can operate so as to step down the voltage applied to the first conduction path 11 (a voltage having a level similar to that of the output voltage of the power source unit 90) and apply a predetermined output voltage to the second conduction path 12. The voltage conversion unit 20 includes a first switching element 22, a second switching element 24, and a first inductor portion 26.

The first switching element 22 and the second switching element 24 are each an element that switches on and off when a control signal (PWM signal) in which an on signal and an off signal are alternately repeated is provided to the element, and are each configured as a known MOSFET, for example. Note that the first switching element 22 is one example of the switching element. The first inductor portion 26 is configured as a known inductor, for example.

The drain of the first switching element 22 is electrically connected to the first conduction path 11, and the source of the first switching element 22 is electrically connected to the drain of the second switching element 24 and one end of the first inductor portion 26. The drain of the second switching element 24 is electrically connected to the source of the first switching element 22 and one end of the first inductor portion 26, and the source of the second switching element 24 is electrically connected to the reference conduction path (ground). One end of the first inductor portion 26 is electrically connected to the source of the first switching element 22 and the drain of the second switching element 24, and the other end of the first inductor portion 26 is electrically connected to the second conduction path 12.

The voltage conversion unit 20 can perform a step-up operation or a step-down operation (step-down operation in the present embodiment) for stepping up or stepping down (stepping down in the present embodiment) the voltage applied to the first conduction path 11 according to the switching of the first switching element 22 between on and off, and applying an output voltage to the second conduction path 12. The voltage conversion unit 20 performs the step-up operation or the step-down operation (step-down operation in the present embodiment) according to a control signal provided to the first switching element 22 from a later-described control circuit 44. Specifically, a configuration is adopted such that, during voltage conversion control in which the control circuit 44 causes the voltage conversion unit 20 to perform a voltage conversion operation, mutually complementary on/off signals (PWM signals) are input to the first switching element 22 and the second switching element 24 from the control circuit 44. During such voltage conversion control, the second switching element 24 is switched off while the first switching element 22 is switched on and the second switching element 24 is switched on while the first switching element 22 is switched off, and dead time during which both elements are switched off is set at the timing when the switching states of the two elements are reversed.

The first voltage detection unit 40 is configured as a known voltage detection circuit, for example. The first voltage detection unit 40 is electrically connected to the second conduction path 12, and can detect a voltage value V1 of the second conduction path 12. Specifically, a voltage detection position P1 of the first voltage detection unit 40 is set between the voltage conversion unit 20 and the second inductor portion 30, and the first voltage detection unit 40 inputs a value indicating the voltage detected at the position P1 to a first deviation calculation unit 46. Note that the value that the first voltage detection unit 40 inputs to the first deviation calculation unit 46 may be any value as long as the voltage value V1 of the second conduction path 12 can be specified therefrom, and may or may not be the voltage value V1 of the second conduction path 12 itself as in FIG. 1. For example, a configuration may be adopted in which the first voltage detection unit 40 includes a voltage dividing circuit, and inputs, to the first deviation calculation unit 46, a voltage obtained by dividing the voltage value V1 according to a predetermined voltage division ratio.

The second voltage detection unit 42 is configured as a known voltage detection circuit, for example. The second voltage detection unit 42 is electrically connected to the load-side conduction path 14, and can detect a voltage value V2 of the load-side conduction path 14. Specifically, a voltage detection position P2 of the second voltage detection unit 42 is set between the second inductor portion 30 and the output-side terminal 62, and the voltage detection position P2 is set closer to the load 92 than the voltage detection position P1 of the first voltage detection unit 40 is. The second voltage detection unit 42 inputs a value indicating the voltage detected at the position P2 to a target voltage setting unit 50. Note that the value that the second voltage detection unit 42 inputs to the target voltage setting unit 50 may be any value as long as the voltage value V2 of the load-side conduction path 14 can be specified therefrom, and may or may not be the voltage value V2 of the load-side conduction path 14 itself as in FIG. 1. For example, a configuration may be adopted in which the second voltage detection unit 42 includes a voltage dividing circuit, and inputs, to the target voltage setting unit 50, a voltage obtained by dividing the voltage value V2 according to a predetermined voltage division ratio.

The voltage conversion control device 3 includes a control unit 5 and the target voltage setting unit 50. The control unit 5 includes the first deviation calculation unit 46 and the control circuit 44. The target voltage setting unit 50 includes a second deviation calculation unit 52 and a PI control unit 54.

The control circuit 44, which is part of the control unit 5, is configured to include a known microcomputer and a drive circuit, for example, and includes a processor such as a CPU and a memory such as a ROM or a RAM. The control circuit 44 can repeatedly perform feedback control for updating the duty ratio of a control signal based on the voltage value V1 input from the first voltage detection unit 40 so as to bring the value of the output voltage applied to the second conduction path 12 closer to a target voltage value Vt, and can output the control signal (first PWM signal) with the updated duty ratio to the first switching element 22 each time the duty ratio is updated. Furthermore, to the second switching element 24, the control circuit 44 can output a control signal (second PWM signal) that is obtained by inverting the on/off of the control signal output to the first switching element 22 (first PWM signal) in a state in which dead time is set.

The first deviation calculation unit 46 may be configured as a known subtraction circuit, for example, and may be realized by a microcomputer. The first deviation calculation unit 46 receives the voltage value V1 of the second conduction path 12 detected by the first voltage detection unit 40 and the target voltage value Vt set by the target voltage setting unit 50 as input values. The first deviation calculation unit 46 calculates the deviation between the target voltage value Vt and the voltage value V1 of the second conduction path 12, which are received as input values, as a first deviation Et1, and outputs the calculated first deviation Et1 as an output value to the control circuit 44.

The target voltage setting unit 50 is configured to include a known microcomputer, for example, and includes a processor such as a CPU and a memory such as a ROM or a RAM. The target voltage setting unit 50 is a portion that sets the target voltage value Vt based on a voltage value of the load-side conduction path 14 (a conduction path that is closer to the load 92 than the voltage detection position P1 of the first voltage detection unit 40 is). In the example illustrated in FIG. 1, a value indicating the voltage value V2 of the load-side conduction path 14 is input from the second voltage detection unit 42 to the target voltage setting unit 50, and the target voltage setting unit 50 sets the target voltage value Vt based on the voltage value V2 of the load-side conduction path 14.

Specifically, the target voltage setting unit 50 sets the target voltage value Vt based on the deviation between a target voltage reference value (final target voltage value) Vft and the voltage value V2 of the load-side conduction path 14. Here, the target voltage reference value (final target voltage value) Vft is the final target value of the target voltage value Vt, which is repeatedly set based on the voltage value V2 of the load-side conduction path 14, and may be set based on a signal from the outside or may be stored in advance. The target voltage setting unit 50 performs known feedback calculation based on the current target voltage value Vt and the target voltage reference value (final target voltage value) Vft so as to bring the target voltage value closer to the target voltage reference value (final target voltage value) Vft, and sets a new target voltage value. Note that, when a cycle at which the target voltage setting unit 50 sets the target voltage value Vt (that is, the cycle at which the target voltage setting unit 50 updates the target voltage value Vt through feedback calculation) is defined as a second cycle, the second cycle is preferably longer than a cycle (first cycle) at which the control circuit 44 updates the duty ratio through feedback calculation. However, the second cycle may be shorter than the first cycle, or may be the same cycle as the first cycle.

The second deviation calculation unit 52 constituting the target voltage setting unit 50 receives the target voltage reference value Vft and the voltage value V2 of the load-side conduction path 14 detected by the second voltage detection unit 42 as input values. The second deviation calculation unit 52 continuously performs calculation for calculating a deviation Et2 (also referred to in the following as a second deviation Et2) between the target voltage reference value (final target voltage value) Vft and the voltage value V2 of the load-side conduction path 14, which are received as input values.

The PI control unit 54 has a function of performing feedback calculation using a known PI calculation method, for example. The PI control unit 54 receives the second deviation Et2 calculated by the second deviation calculation unit 52 as an input value, and performs feedback calculation for determining the target voltage value Vt based on the second deviation Et2 so as to bring the voltage value V2 closer to the target voltage reference value (final target voltage value) Vft using known PI calculation. The PI control unit 54 executes such feedback calculation (PI calculation) cyclically at the second cycle.

Next, the operations of the power supply device 1 will be described.

Figure 2:
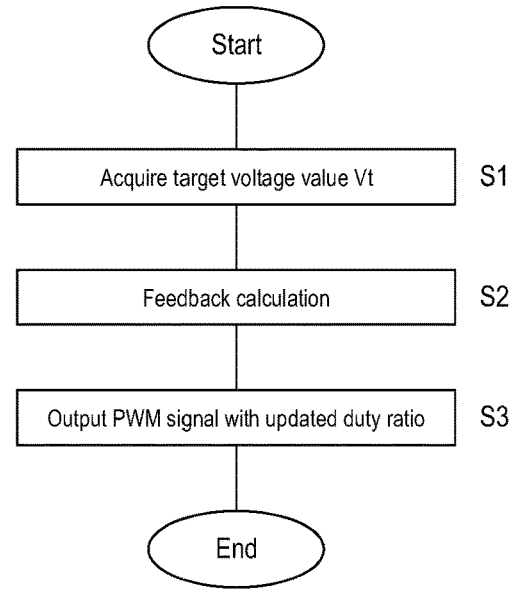
FIG. 2 is a flowchart illustrating an example flow of voltage conversion control performed in the on-board power supply device illustrated in FIG. 1.

If a predetermined starting condition is satisfied, the voltage conversion control device 3 repeatedly performs the voltage conversion control illustrated in FIG. 2 and causes the voltage conversion unit 20 to perform the voltage conversion operation. Note that, in the power supply device 1, a "signal indicating that a starting switch (specifically, an ignition switch, for example) for starting a power source of a vehicle is on" and a "signal indicating that the starting switch is off" are input to the voltage conversion control device 3 from an external device that is not illustrated. When such a configuration is adopted, it may be regarded that "the starting condition is satisfied" when the state of the starting switch has switched from off to on. This example will be described below.

If the above-described starting condition is satisfied, the control device 3 repeatedly performs the voltage conversion control illustrated in FIG. 2 at the predetermined first cycle. When the control device 3 starts the control illustrated in FIG. 2, first, the control device 3 determines a target voltage value Vt in step S1. The processing in step S1 is processing in which the control unit 5 acquires the target voltage value Vt currently set by the target voltage setting unit 50 (when step S1 is executed).

Here, target voltage value setting processing performed by the target voltage setting unit 50 will be described.

Figure 3:
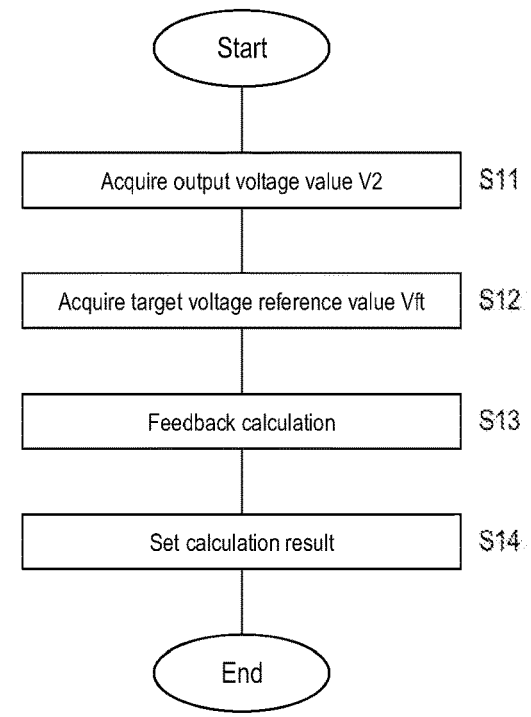
FIG. 3 is a flowchart illustrating an example flow of target voltage value setting processing performed in the on-board power supply device illustrated in FIG. 1.

The target voltage setting unit 50 repeatedly performs the target voltage value setting processing as illustrated in FIG. 3 at the predetermined second cycle (for example, a cycle that is longer than the above-described first cycle). Once the target voltage setting unit 50 starts the processing illustrated in FIG. 3, the target voltage setting unit 50 first acquires the voltage value V2 of the load-side conduction path 14 (step S11). Then, following step S11, the target voltage setting unit 50 acquires the target voltage reference value (final target voltage value) Vft (step S12). The processing in step S11 and the processing in step S12 may be performed concurrently or in the opposite order. Specifically, the second deviation calculation unit 52 performs the processing in steps S11 and S12, and calculates the deviation Et2 (also referred to in the following as a second deviation Et2) between the voltage value V2 of the load-side conduction path 14 input when step S11 is performed and the target voltage reference value (final target voltage value) Vft input when step S12 is performed.

Following steps S11 and S12, the target voltage setting unit 50 performs feedback calculation for calculating a new target voltage value Vt (step S13). The PI control unit 54 performs the processing in step S13. The PI control unit 54 acquires the second deviation Et2 calculated by the second deviation calculation unit 52 through steps S11 and S12, and sets a target voltage value Vt based on the second deviation Et2. Specifically, the PI control unit 54 performs feedback calculation using a known PI calculation method, and the feedback calculation is a calculation for calculating a new target voltage value Vt based on a proportional gain and an integral gain that are set in advance and the deviation (second deviation Et2) between the voltage value V2 and the target voltage reference value (final target voltage value) Vft acquired when the calculation is performed (when steps S11 to S13 are executed) so as to bring the voltage value V2 closer to the target voltage reference value (final target voltage value) Vft. The proportional gain, integral gain, and derivative gain that are used in the PI calculation method or a PID calculation method are each set to an appropriate fixed value in advance.

Each time the PI control unit 54 performs feedback calculation (for example, the PI calculation) in step S13 in the processing illustrated in FIG. 3, which is repeated at the second cycle (i.e., for each second cycle), the PI control unit 54 sets (updates) the target voltage value Vt calculated in step S13 as the current target voltage value Vt (step S14). For example, the PI control unit 54 outputs the current target voltage value Vt set in step S14 as an output value to the first deviation calculation unit 46, and retains the target voltage value Vt (output value) set in step S14 in each cycle until a target voltage value Vt is newly set in step S14 in the next cycle.

The target voltage value Vt is set as a result of such processing being performed, and the control unit 5 acquires the latest target voltage value Vt that is set when the processing in step S1 is executed, each time the processing in step S1 is performed in the repeatedly executed control illustrated in FIG. 2.

Following step S1 illustrated in FIG. 2, the control unit 5 performs feedback calculation for determining the duty ratio based on the current output voltage value V1 of the second conduction path 12 (when step S2 is executed) and the target voltage value Vt acquired in the most recent step S1 so as to bring the output voltage value V1 closer to the target voltage value Vt using a known PI calculation method or PID calculation method (step S2).

Specifically, while the control unit 5 is repeating the voltage conversion control illustrated in FIG. 2 (that is, while the voltage conversion unit 20 is performing the voltage conversion operation), the deviation Et1 (first deviation Et1) between the voltage value V1 of the second conduction path 12 detected by the first voltage detection unit 40 and the target voltage value Vt set by the target voltage setting unit 50 is continuously supplied from the first deviation calculation unit 46 to the control circuit 44. Furthermore, in the processing in step S2, the control circuit 44 acquires the first deviation Et1 and performs feedback calculation for calculating a new duty ratio reflecting the acquired first deviation Et1.

In the processing in step S2, the control unit 5 (specifically, the control circuit 44) performs feedback calculation for determining the duty ratio based on the first deviation Et1 input from the first deviation calculation unit 46 so as to bring the output voltage value V1 of the second conduction path 12 closer to the target voltage value Vt using a known PI calculation method or PID calculation method. Note that feedback calculation for "calculating a new duty ratio based on the current output voltage value and a target voltage value so as to bring the output voltage value closer to the target voltage value using a PI calculation method or PID calculation method" is well known in the control of DC/DC converters, and thus the details thereof will be omitted. The proportional gain, integral gain, and derivative gain that are used in the PI calculation method or PID calculation method are each set to an appropriate fixed value in advance, for example.

In such a manner, the control unit 5 updates the duty ratio in step S2 each time the control illustrated in FIG. 2 is performed (that is, for each first cycle), and retains the duty ratio set in the immediate step S2 until the duty ratio is updated in the next step S2.

Following the processing in step S2, the control unit 5 outputs a PWM signal in which the new duty ratio calculated in the most recent step S2 is used (step S3). The control unit 5 continues outputting a PWM signal in a manner such that, if the control unit 5 outputs a PWM signal with the duty ratio calculated in the most recent step S2 in step S3, the control unit 5 retains the PWM signal with the calculated duty ratio until the next step S3 (step S3 in the next cycle), and if the control unit 5 updates the duty ratio in the next step S3, the control unit 5 continues to output the PWM signal with the updated duty ratio until step S3 following the next step S3.

In such a manner, while the control illustrated in FIG. 2 is repeated, the control unit 5 continuously outputs a PWM signal having the latest duty ratio to the first switching element 22 and outputs a complementary signal to the second switching element 24. The voltage conversion unit 20 receives such control signals and performs the voltage conversion operation (specifically, a step-down operation) so as to bring the voltage of the second conduction path 12 closer to the target voltage value Vt.

Here, a transitional state in a case in which the voltage conversion operation of the voltage conversion unit 20 is started while the voltage conversion unit 20 is in a stopped state will be described.

Figure 4:
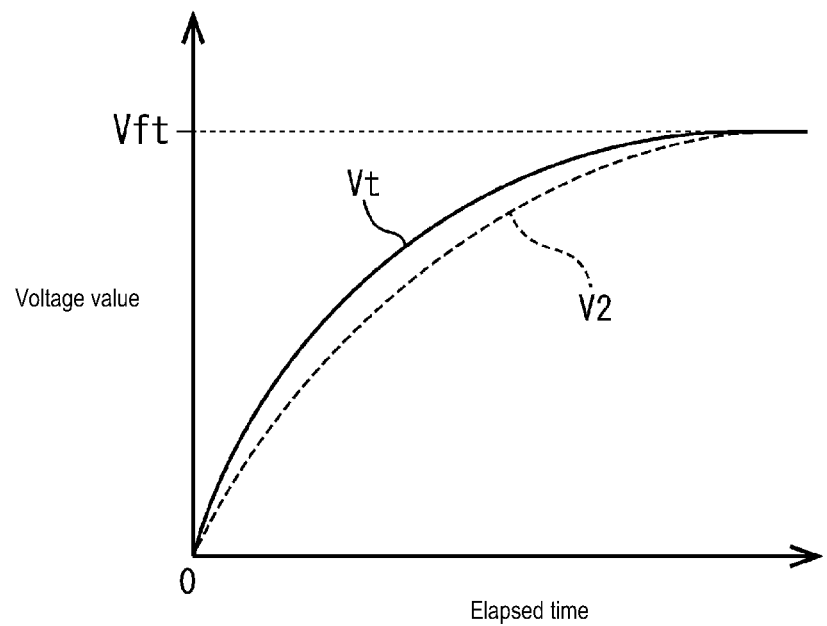
FIG. 4 is a graph describing, inter alia, a change in a target voltage value during a transitional state immediately following the startup of a voltage conversion unit.

While the voltage conversion unit 20 is in a stopped state, the voltage value V1 of the second conduction path 12 and the voltage value V2 of the load-side conduction path 14 are set to 0V for example. As illustrated for example in FIG. 4, in the power supply device 1 during an initial stage immediately after the voltage conversion unit 20 starts the voltage conversion operation (immediately after time 0), the voltage value V2 of the load-side conduction path 14 is a value close to 0V and thus the PI control unit 54 performs feedback calculation (PI calculation) based on the target voltage reference value Vft and the voltage value V2, which is around 0V and updates the target voltage value Vt to a value slightly higher than the voltage value V2 at that point in time (approximately 0V). When such setting (updating) is performed, the control unit 5 controls the voltage conversion unit 20 so that the output voltage value V1 equals the newly set target voltage value Vt (value slightly higher than 0V), and thus the voltage value V2 of the load-side conduction path 14 slightly increases as a result of this control. Then, when the voltage value V2 increases in such a manner, the PI control unit 54 performs feedback calculation (PI calculation) based on the increased voltage value V2 and the target voltage reference value Vft in the next cycle, and updates the target voltage value Vt to a value that is higher than the increased voltage value V2. When updating is performed in such a manner, the control unit 5 controls the voltage conversion unit 20 so that the output voltage value (voltage value V1) equals the newly set target voltage value Vt. Thus, the voltage value V2 of the load-side conduction path 14 further increases, and in the next cycle, the PI control unit 54 updates the target voltage value Vt so that a value higher than this voltage value V2 is achieved.

Due to such control being performed, until the target voltage value Vt reaches the target voltage reference value Vft, the target voltage value Vt gradually increases due to the PI control unit 54 repeating feedback calculation (PI calculation), and the output voltage value V1 of the voltage conversion unit 20 and the voltage value V2 of the load-side conduction path 14 gradually increase as the target voltage value Vt increases. Since the output voltage of the voltage conversion unit 20 can be gradually increased over a predetermined period of time from when the voltage conversion operation is started in such a manner, soft start-control can be realized. Then, the target voltage value Vt eventually settles near the target voltage reference value Vft, and once the target voltage value Vt reaches the target voltage reference value Vft, the voltage conversion unit 20 performs the voltage conversion operation so as to output the target voltage reference value Vft to the second conduction path 12.

Next, the effects of the power supply device 1 will be described.

The power supply device 1 includes: a first voltage detection unit 40 that detects a value (voltage value V1) of a first voltage that is applied to a second conduction path 12; a second voltage detection unit 42 that detects a value (voltage value V2) of a second voltage that is applied to a load-side conduction path 14 interposed between the second conduction path 12 and a load 92; a target voltage setting unit 50 that sets a target voltage value Vt based on the value (voltage value V2) of the second voltage detected by the second voltage detection unit 42; and a control unit 5. Furthermore, the control unit 5 repeatedly performs feedback calculation for updating a duty ratio of a control signal based on the value V1 of the first voltage detected by the first voltage detection unit 40 so as to bring the value V1 of the first voltage applied to the second conduction path 12 closer to the target voltage value Vt.

When such a configuration is adopted, the target voltage setting unit 50 can set the target voltage value Vt based on the voltage value V2 of a path (load-side conduction path 14) that is closer to the load 92 than the second conduction path 12, to which the output voltage from the voltage conversion unit 20 is applied, is. Accordingly, even if the physical characteristics of the second conduction path 12 and the load-side conduction path 14 differ, a target voltage value Vt that is suitable as the voltage applied to the load 92 can be responsively set. In particular, when compared with a configuration in which the target voltage value Vt is set based on the voltage value V1 of the second conduction path 12, because the target voltage value Vt can be set based on the voltage value V2 of a position closer to the load 92, the target voltage value Vt can be set so as to be in further accordance with the load voltage even if the voltage value V1 of the second conduction path 12 and the voltage value V2 of the load-side conduction path 14 differ.

The target voltage setting unit 50 operates so as to repeatedly perform processing for updating the target voltage value Vt based on a deviation (second deviation Et2) between a preset target voltage reference value Vft and the value (voltage value V2) of the second voltage detected by the second voltage detection unit 42 so as to bring the target voltage value Vt closer to the target voltage reference value Vft. When such a configuration is adopted, even if the value V2 of the second voltage applied to the load-side conduction path 14 differs from the target voltage reference value Vft, the target voltage value Vt can be gradually brought closer to the target voltage reference value Vft while responsively setting a target voltage value Vt that is suitable for the voltage applied to the load 92 by repeating processing for updating the target voltage value Vt based on the voltage value V2 of the load-side conduction path 14.

A cycle (second cycle) at which the target voltage setting unit 50 updates the target voltage value Vt is longer than a cycle (first cycle) at which the control unit 5 updates the duty ratio. When such a configuration is adopted, the update frequency of the duty ratio of a PWM signal can be increased by setting a short update cycle. On the other hand, since the target voltage value Vt can be updated at a cycle longer than the update cycle of the duty ratio, the processing load required to update the target voltage value Vt can be suppressed.

The power supply device 1 includes electronic components that are arranged between the second conduction path 12 and the load-side conduction path 14. The electronic components include a resistor portion 32 and an inductor portion 30. When such a configuration is adopted, while utilizing the functions of the electronic components, the target voltage can be set in accordance with the voltage of the load-side conduction path even if the voltage of the second conduction path and the voltage of the load-side conduction path differ from one another due to the electronic components. In particular, if the resistor portion 32 and the inductor portion 30 are interposed, advantages are realized because a current detection function, a filter function, or other functions can be added along the path from the voltage conversion unit 20 to the load 92. On the other hand, there is a problem in that the voltage of the second conduction path 12 and the voltage of the load-side conduction path 14 are likely to differ from one another. In this regard, by adopting the above-described configuration, the problem of an inappropriate target voltage value being set due to the above-described difference is readily overcome since the target voltage value Vt can be set based on the voltage of the load-side conduction path 14.

Second Embodiment

The on-board power supply device 1 according to embodiment 2 is obtained by replacing the target voltage setting unit 50 in the on-board power supply device 1 according to embodiment 1 with a target voltage setting unit 250, and the rest of the configurations of the on-board power supply device 1 according to embodiment 2 are the same as those of the on-board power supply device 1 according to embodiment 1. Note that the same reference symbols are given to configurations that are the same as those in embodiment 1, and a description thereof will be omitted.

The target voltage setting unit 250 is configured to calculate and output a target voltage value Vt based on a target voltage reference value Vft and a voltage value V2 of the load-side conduction path 14 that are input thereto similarly to the target voltage setting unit 50 in embodiment 1, and is configured to calculate a current target voltage value Vt by taking a target voltage value Vt output in the past in consideration. The target voltage setting unit 250 is configured as a digital filter (Finite Impulse Response (FIR) filter), and is constituted by an integrated circuit (IC) or a microcomputer that can perform software processing or logic processing, for example.

Figure 5:
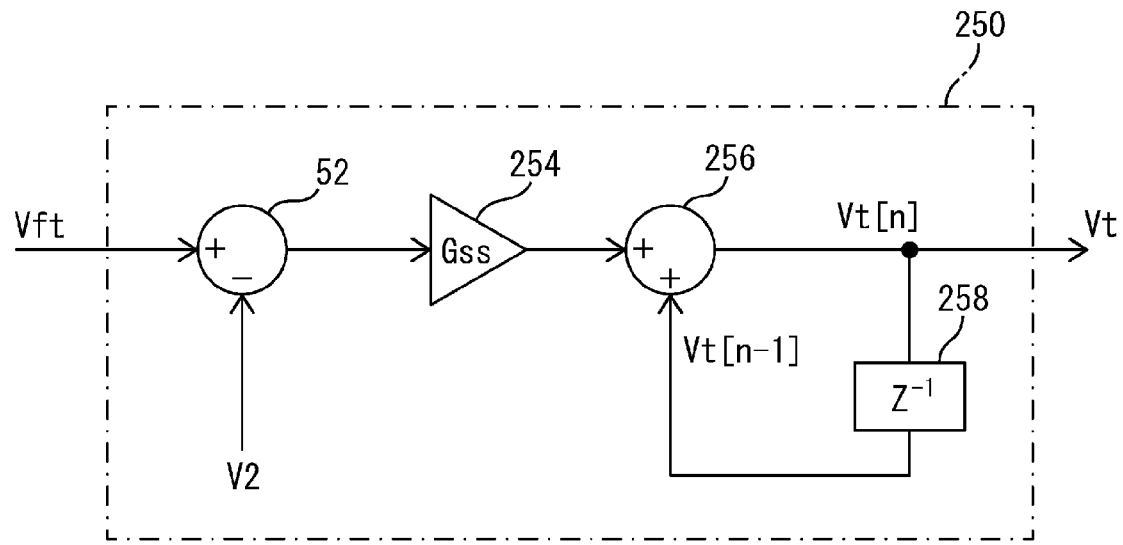
FIG. 5 is a circuit diagram schematically illustrating a target voltage setting unit in embodiment 2.

As illustrated in FIG. 5, the target voltage setting unit 250 includes the second deviation calculation unit 52, a multiplying unit 254, an adding unit 256, and a delay unit 258.

The second deviation calculation unit 52 has the function of performing calculation using the target voltage reference value Vft and the voltage value V2 of the load-side conduction path 14 as input values. The second deviation calculation unit 52 has the function of calculating the deviation (second deviation Et2) between the target voltage reference value Vft and the voltage value V2 of the load-side conduction path 14, which are received as input values, and outputting the calculated second deviation Et2 as an output value (calculated value).

The multiplying unit 254 has the function of multiplying the second deviation Et2 input thereto by a preset coefficient Gss, and outputting the product as an output value (calculated value). The coefficient Gss is a value that is 1 or less.

The adding unit 256 has the function of calculating a target voltage value Vt and outputting this target voltage value Vt as an output value (calculated value) to the first deviation calculation unit 46. The delay unit 258 has the function of receiving the target voltage value Vt calculated by the adding unit 256 as an input value, and providing the adding unit 256 with an output value when the adding unit 256 calculates the next target voltage value Vt. That is, when calculating an nth target voltage value Vt[n], the adding unit 256 receives an (n−1)th target voltage value Vt[n−1] generated by the delay unit 258 as an input value. The adding unit 256 calculates the target voltage value Vt[n] by adding the above-described product, which is the output value from the multiplying unit 254, and the above-described target voltage value Vt[n−1], which is the output value from the delay unit 258, and outputs this target voltage value Vt[n] as an output value (calculated value) to the first deviation calculation unit 46.

By adopting such a calculation method, the on-board power supply device 1 according to embodiment 2 can set a target voltage value Vt in which a past target voltage value Vt is taken into consideration.

Third Embodiment

The on-board power supply device 1 according to embodiment 3 is obtained by replacing the target voltage setting unit 50 in the on-board power supply device 1 according to embodiment 1 with a target voltage setting unit 350, and the rest of the configurations of the on-board power supply device 1 according to embodiment 3 are the same as those of the on-board power supply device 1 according to embodiment 1. Note that the same reference symbols are given to configurations that are the same as those in embodiment 1, and a description thereof is omitted.

The target voltage setting unit 350 is configured to calculate and output a target voltage value Vt based on a second deviation Et2 similarly to the target voltage setting unit 50 in embodiment 1, and is configured to calculate a current target voltage value Vt taking a second deviation Et2 calculated in the past into consideration. The target voltage setting unit 350 is configured as a digital filter (Infinite Impulse Response (IIR) filter), and is constituted by an IC or a microcomputer that can perform software processing or logic processing, for example.

Figure 6:
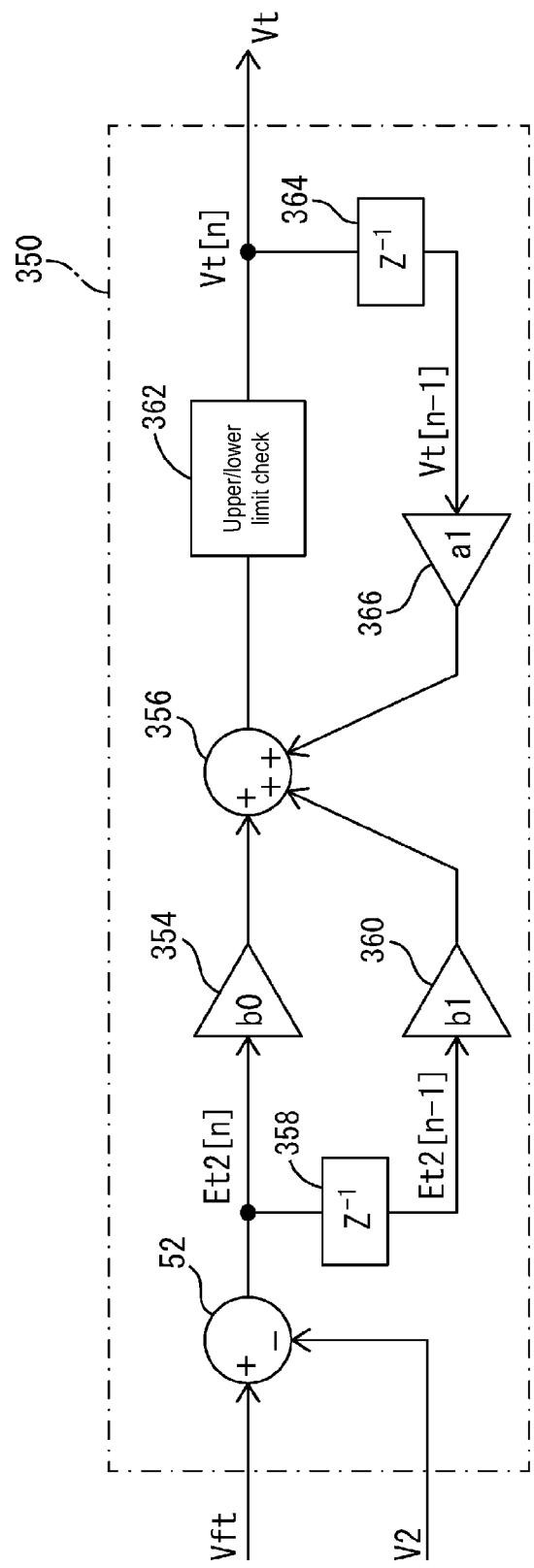
FIG. 6 is a circuit diagram schematically illustrating a target voltage setting unit in embodiment 3.

As illustrated in FIG. 6, the target voltage setting unit 350 includes the second deviation calculation unit 52, a multiplying unit 354, an adding unit 356, a delay unit 358, a multiplying unit 360, an upper/lower limit checking unit 362, a delay unit 364, and a multiplying unit 366.

The second deviation calculation unit 52 has the function of performing calculation using the target voltage reference value Vft and the voltage value V2 of the load-side conduction path 14 as input values. The second deviation calculation unit 52 calculates the deviation (second deviation Et2) between the target voltage reference value Vft and the voltage value V2 of the load-side conduction path 14, which are received as input values, and outputs the calculated second deviation Et2 as an output value (calculated value).

The multiplying unit 354 has the function of performing calculation using the second deviation Et2 calculated by the second deviation calculation unit 52 as an input value. The multiplying unit 354 functions so as to multiply the second deviation Et2 calculated by the second deviation calculation unit 52 by a preset coefficient b0 and output the product as an output value (calculated value).

The delay unit 358 receives the second deviation Et2, which is the output value (calculated value) from the second deviation calculation unit 52, as an input value. The delay unit 358 outputs the second deviation Et2 calculated by the second deviation calculation unit 52 in a delayed state, and outputs an (n−1)th second deviation Et2[n−1] calculated by the second deviation calculation unit 52 as an output value to the multiplying unit 360 when an nth second deviation Et2[n] is calculated by the second deviation calculation unit 52.

The multiplying unit 360 receives the second deviation Et2[n−1], which is the output value from the delay unit 358, as an input value. The multiplying unit 360 multiplies the second deviation Et2[n−1], which is the output value from the delay unit 358, by a preset coefficient b1 and outputs the product as an output value (calculated value) to the adding unit 356.

The adding unit 356 receives the output value (product) from the multiplying unit 354, the output value (product) from the multiplying unit 360, and an output value (product) from the later-described multiplying unit 366 as input values. The adding unit 356 adds the product from the multiplying unit 354, the product from the multiplying unit 360, and the product from the multiplying unit 366, which are received as input values, and outputs the sum as an output value to the upper/lower limit checking unit 362.

The upper/lower limit checking unit 362 receives the output value (sum) calculated by the adding unit 356 as an input value. The upper/lower limit checking unit 362 outputs a preset upper limit value as an output value if the output value (sum) generated by the adding unit 356 exceeds the upper limit value, outputs a preset lower limit value as an output value if the output value (sum) generated by the adding unit 356 falls below the lower limit value, and outputs the output value (sum) calculated by the adding unit 356 as an output value if the output value (sum) calculated by the adding unit 356 is within a preset range. The upper/lower limit checking unit 362 sets the checked value as a target voltage value Vt and outputs the target voltage value Vt as an output value to the first deviation calculation unit 46.

The delay unit 364 receives the target voltage value Vt output from the upper/lower limit checking unit 362 as an input value. The delay unit 364 delays the target voltage value Vt received as the input value, and inputs the delayed target voltage value Vt to the multiplying unit 366 the next time the adding unit 356 performs adding processing. That is, when the target voltage setting unit 350 sets an nth target voltage value Vt[n], the delay unit 364 outputs an (n−1)th target voltage value Vt[n−1] to the multiplying unit 366 as an output value.

The multiplying unit 366 receives the target voltage value Vt[n−1], which is the output value from the delay unit 364, as an input value. The multiplying unit 366 multiplies the target voltage value Vt[n−1], which is the output value from the delay unit 364, by a preset coefficient a1 and outputs the product as an output value to the adding unit 356. Note that it suffices to set b0, b1, and a1 to arbitrarily defined values so that desired filter characteristics are realized.

By adopting such a calculation method, the on-board power supply device 1 according to embodiment 3 can set a target voltage value Vt in which a past second deviation Et2 is taken into consideration.

OTHER EMBODIMENTS

The present disclosure is not limited to the embodiments that have been described based on the description above and the drawings, and embodiments such as those described below are also included in the present disclosure, for example.

In the above-described embodiments, a non-isolated synchronous rectification-type DC/DC converter is described as an example of the voltage conversion unit 20. However, a diode-type DC/DC converter may be adopted in any of the examples of the present disclosure. Furthermore, while a step-down DC/DC converter is described as an example in the above-described embodiments, a step-up DC/DC converter or a step-up/step-down DC/DC converter may be adopted in any of the examples of the present disclosure. In addition, while a uni-directional DC/DC converter functioning with the first conduction path as the input side and the second conduction path as the output side is described as an example in the above-described embodiments, a bi-directional DC/DC converter also capable of functioning with the second conduction path as the input side and the first conduction path as the output side may be adopted in any of the examples of the present disclosure. Furthermore, various known elements and configurations can be adopted for the elements and specific configurations forming the voltage conversion unit 20 as well.

While a lead battery is used for the power source unit 90 in the above-described embodiments, other power source means (other publicly known power storage means, power generation means, etc.) may be used for the power source unit 90 in place of or in combination with the lead battery in any of the examples of the present disclosure.

While the PI control unit 54 is described in embodiment 1 as an example of a feedback calculation unit included in the target voltage setting unit 50, a PID control unit that performs publicly known PID calculation may be adopted as the feedback calculation unit included in the target voltage setting unit 50.

While the control circuit 44 and the first deviation calculation unit 46 are configured as separate circuits in embodiment 1, the control circuit 44 and the first deviation calculation unit 46 may be realized by a common circuit. For example, a microcomputer may function as the control circuit 44 and the first deviation calculation unit 46. Furthermore, while the PI control unit 54 and the second deviation calculation unit 52 are configured as separate circuits in embodiment 1, the PI control unit 54 and the second deviation calculation unit 52 may be realized by a common circuit. For example, a microcomputer may function as the PI control unit 54 and the second deviation calculation unit 52. Furthermore, while the control unit 5 and the target voltage setting unit 50 are configured as separate circuits in embodiment 1, the control unit 5 and the target voltage setting unit 50 may be realized by a common circuit. For example, a microcomputer may have may function as the control unit 5 and the target voltage setting unit 50.

In embodiment 2, the target voltage setting unit 250 is configured to calculate a target voltage value Vt in a current iteration taking a target voltage value Vt calculated in a previous iteration into configuration, but the target voltage setting unit 250 may be configured to calculate a target voltage value Vt in a current iteration taking a target voltage value Vt calculated two or more iterations ago into consideration. Furthermore, the target voltage setting unit 250 is configured to calculate a target voltage value Vt in a current iteration taking only a target voltage value Vt corresponding to one past iteration into configuration, but the target voltage setting unit 250 may be configured to calculate a target voltage value Vt in a current iteration taking target voltage values Vt corresponding to multiple past iterations into consideration.

In embodiment 3, the target voltage setting unit 350 is configured to calculate a target voltage value Vt in a current iteration taking a second deviation Et2 calculated in a previous iteration into configuration, but the target voltage setting unit 350 may be configured to calculate a target voltage value Vt in a current iteration taking a second deviation Et2 calculated two or more iterations ago into consideration. Furthermore, the target voltage setting unit 350 is configured to calculate a target voltage value Vt in a current iteration taking only a second deviation Et2 corresponding to one past iteration into configuration, but the target voltage setting unit 350 may be configured to calculate a target voltage value Vt in a current iteration taking second deviations Et2 corresponding to multiple past iterations into consideration.

While a configuration in which a microcomputer is included as a feedback calculation unit included in the target voltage setting unit 50 is described as an example in embodiment 1, the feedback calculation unit may be configured using a hardware circuit. For example, the PI control unit may be configured as a publicly known PI control circuit configured to include an amplifier, a resistor, a capacitor, etc., or a publicly known PID control circuit configured to include an amplifier, a resistor, a capacitor, etc.

The invention claimed is:

1. An on-board power supply device comprising:
   a voltage conversion unit that includes a switching element that switches on and off according to a control signal in which an on signal and an off signal are alternately repeated provided to the switching element, the voltage conversion unit stepping up or stepping down a voltage applied to a first conduction path according to the switching of the switching element between on and off, and applying a voltage to a second conduction path;
   a first voltage detection unit that detects a value of a first voltage that is applied to the second conduction path;
   a second voltage detection unit that detects a value of a second voltage that is applied to a load-side conduction path that is interposed between the second conduction path and a load;
   a target voltage setting unit that sets a target voltage value based on the value of the second voltage detected by the second voltage detection unit; and
   a control unit including a microcomputer that repeatedly performs a feedback calculation for updating a duty ratio of the control signal based on the value of the first voltage detected by the first voltage detection unit so as to bring the value of the first voltage applied to the second conduction path closer to the target voltage value, and outputs the control signal with the updated duty ratio to the switching element each time the duty ratio is updated.

2. The on-board power supply device according to claim 1, wherein the target voltage setting unit repeatedly performs processing for updating the target voltage value based on a deviation between a preset target voltage reference value and the value of the second voltage detected by the second voltage detection unit so as to bring the target voltage value closer to the target voltage reference value.

3. The on-board power supply device according to claim 1, wherein a cycle at which the target voltage setting unit updates the target voltage value is longer than a cycle at which the control unit updates the duty ratio.

4. The on-board power supply device according to claim 1, further comprising:
one or more electronic components that are arranged between the second conduction path and the load-side conduction path,
wherein the one or more electronic components include at least one of a resistor portion and an inductor portion.

5. The on-board power supply device according to claim 2, wherein a cycle at which the target voltage setting unit updates the target voltage value is longer than a cycle at which the control unit updates the duty ratio.

6. The on-board power supply device according to claim 2, further comprising:
one or more electronic components that are arranged between the second conduction path and the load-side conduction path,
wherein the one or more electronic components include at least one of a resistor portion and an inductor portion.

7. The on-board power supply device according to claim 3, further comprising:
one or more electronic components that are arranged between the second conduction path and the load-side conduction path,
wherein the one or more electronic components include at least one of a resistor portion and an inductor portion.

* * * * *